(12) United States Patent
Donadon

(10) Patent No.: US 9,326,441 B2
(45) Date of Patent: May 3, 2016

(54) CALIBRATION DEVICE FOR PNEUMATIC SEED DRILL

(75) Inventor: Gianfranco Donadon, Campodarsego (IT)

(73) Assignee: MASCHIO GASPARDO S.P.A., Campodarsego (PD) (IT)

( * ) Notice: Subject to any disclaimer, the term of this patent is extended or adjusted under 35 U.S.C. 154(b) by 100 days.

(21) Appl. No.: 14/007,160

(22) PCT Filed: Mar. 23, 2012

(86) PCT No.: PCT/IB2012/051399
§ 371 (c)(1),
(2), (4) Date: Sep. 24, 2013

(87) PCT Pub. No.: WO2012/131551
PCT Pub. Date: Oct. 4, 2012

(65) Prior Publication Data
US 2014/0014011 A1     Jan. 16, 2014

(30) Foreign Application Priority Data
Mar. 25, 2011   (IT) .............................. PD2011A0093

(51) Int. Cl.
*A01C 7/10*   (2006.01)
*A01C 17/00*  (2006.01)

(52) U.S. Cl.
CPC ................. *A01C 7/107* (2013.01); *A01C 7/102* (2013.01); *A01C 17/006* (2013.01)

(58) Field of Classification Search
USPC .......................... 111/170, 174, 200; 221/211
See application file for complete search history.

(56) References Cited

U.S. PATENT DOCUMENTS

| 6,230,636 | B1 * | 5/2001 | Bom et al. ...................... 111/13 |
| 6,584,920 | B1 | 7/2003 | Cresswell |
| 8,701,575 | B2 * | 4/2014 | Friggstad ...................... 111/178 |
| 2010/0307395 | A1 * | 12/2010 | Snipes ............................ 111/11 |

FOREIGN PATENT DOCUMENTS

| CA | 2 311 698 A1 | 12/2001 |
| DE | 339542 C * | 7/1921 |
| DE | 475086 C * | 4/1929 |
| DE | 10 2010 002200 A1 | 12/2010 |
| GB | 1557333 A | 12/1979 |

OTHER PUBLICATIONS

ISR and Written Opinion in PCT/IB2012/051399 dated Jul. 19, 2012.

* cited by examiner

*Primary Examiner* — Alicia Torres
(74) *Attorney, Agent, or Firm* — Kristina Castellano; Castellano PLLC

(57) ABSTRACT

A device for calibrating the product dispensed by a distributor (5) of granular materials comprises a calibration aperture (9) formed in a through-conduit (8) for the granular material between the distributor (5) of the seed and a device (4) for transporting the material, and a gate (10) associated with the calibration aperture (9) and movable between a calibration position, in which the aperture (9) is open and the material from the distributor (5) is conducted via the aperture (9), and a distribution position, in which the aperture (9) is closed and the material is conducted therebeyond along the through-conduit (8), wherein a motorized actuator (11) is connected to the gate (10) so as to make the gate (10) movable between those positions.

13 Claims, 4 Drawing Sheets

CALIBRATION DEVICE FOR PNEUMATIC SEED DRILL

CROSS REFERENCE TO RELATED APPLICATIONS

This application is a U.S. National Stage Application of PCT/IB2012/051399 filed on Mar. 23, 2012, which claims priority to Italian patent application PD2011A000093 filed on Mar. 25, 2011, the contents of both of which are incorporated herein by reference.

FIELD

The present invention relates to a device for calibrating the product dispensed by a granular material distributor, particularly intended for calibrating and consequently regulating the quantity of granular material, such as seeds, fertilizers or the like, dispensed by the distributor of a pneumatic agricultural seed-drill.

BACKGROUND

In agricultural seed-drills with pneumatic distribution, there are conventionally used rotating distributors having blades which can be regulated in order to vary the quantity of material dispensed per unit of surface-area both via changes of speed and by means of volumetric variation of the bladed members of the distributor. The regulation brought about must be controlled by means of a so-called calibration operation before starting the distribution in the field so as to ascertain that the quantity of material effectively distributed per unit of surface-area corresponds to the desired expectations.

For that reason along the through-conduit for the material dispensed by the distributor towards the pneumatic transport device of the material, there is provided the possibility of varying the flow of the material being moved towards a collection container so as to be able to put into operation manually, in a simulated manner, the distributor and to weigh the material dispensed in that manner.

Typically, this operation is carried out by temporarily disassembling a portion of the distribution conduit.

This is really inconvenient because it requires that the operator slide between the tubes and components of the seed-drill until he reaches the gate or component to be disassembled, actuate the distributor, re-mount the component removed or move the gate and then come back out of the narrow position previously reached.

The inconvenience is such that very often the operator cannot check that the gate has been precisely replaced in the correct original position and starts the distribution of the product in the field with a calibration device which is open and not completely closed.

As an alternative to that solution, there are also known seed-drills which are provided with a gate which can be actuated in order to open or close an aperture in the conduit mentioned above and to obtain selectively a calibration position and a sowing position.

The Utility Model DE 10 2010 002200 describes a calibration device for seed-drills in which a conduit for transporting the sowing products is selectively opened or closed by means of a slidable member.

During the sowing step, the member is withdrawn from the conduit, thereby leaving it open and allowing the material to arrive at the seed distributors.

Conversely, in a second position, the member is introduced in the conduit and blocks the flow of material by means of a wall thereof, redirecting it towards a discharge aperture, thereby allowing the calibration step.

However, that solution also has disadvantages. Although there is provided the possibility of using actuators for activating the member, the use of a sliding linear member involves a specific risk of jamming of the device owing to dust, sand, straw and other material which is in the working environment and which may readily become introduced into the sliding members of the member.

In addition, when it is in a calibration position, the member intercepts the conduit in which the flow of air mixed with the product to be sown flows and during the movement of the member material, which may partially obstruct the conduit or the other sowing elements, can also readily be moved inside the conduit.

SUMMARY

The problem addressed by the present invention is to provide a device for calibrating the above-mentioned functionalities which is structurally and functionally configured so as to allow all the disadvantages set out with reference to the cited prior art to be overcome.

This problem is solved by the invention with a calibration device constructed according to the appended claims.

BRIEF DESCRIPTION OF THE DRAWINGS

The features and advantages of the invention will be better appreciated from the detailed description of a preferred but non-limiting embodiment thereof in which.

DETAILED DESCRIPTION

Figure 1:
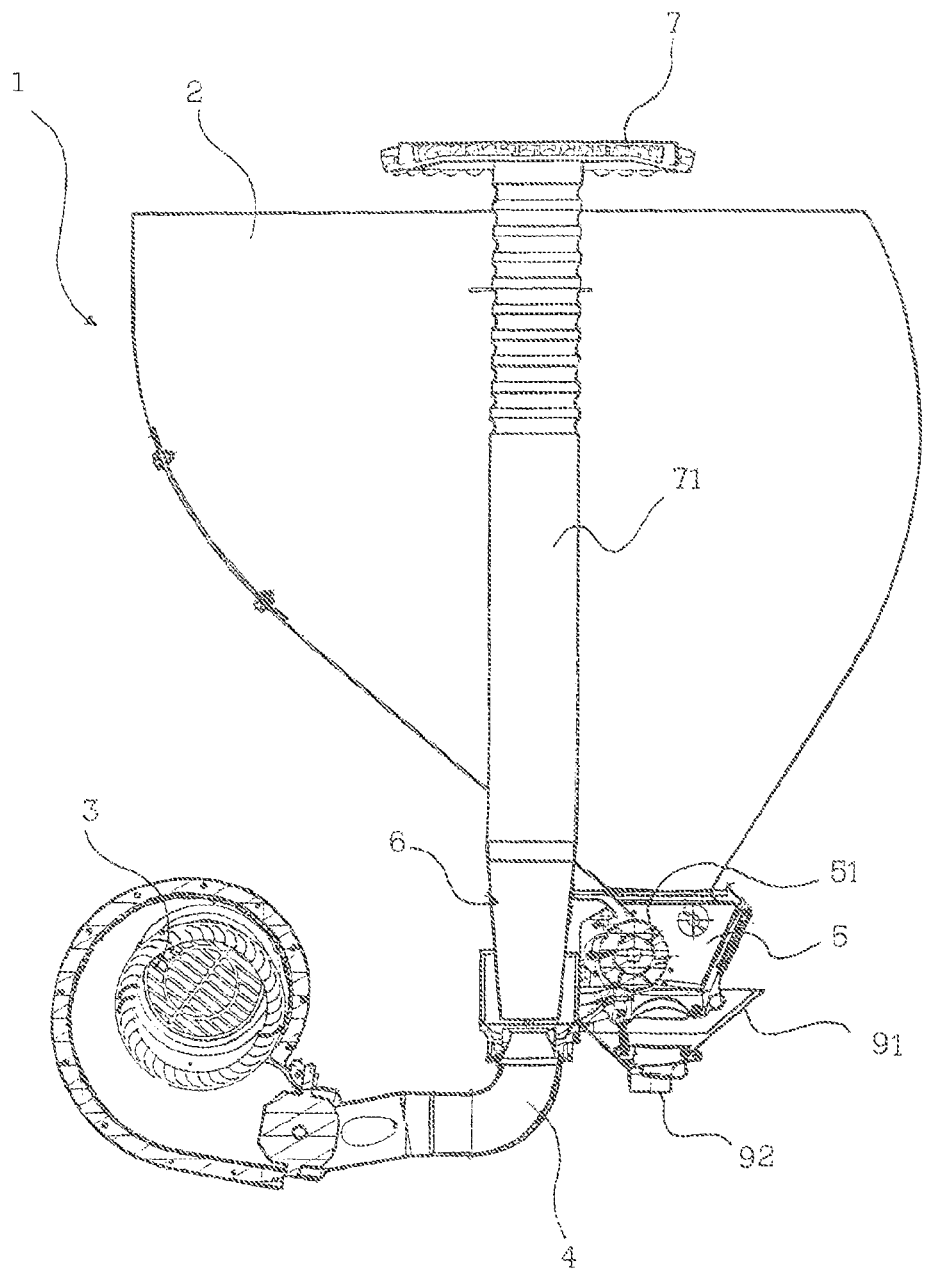
FIG. 1 is a schematic cross-section of a pneumatic seeding machine.

In the Figures, there is generally designated 1 a pneumatic seed-drill which is schematically illustrated in terms of only the main components. The seed-drill 1 comprises a receptacle 2, in which the granular material to be distributed is contained, a fan 3 or other type of air compressor, a device for pneumatic transport 4 with a Venturi tube (Venturi below for the sake of brevity), in which the flow of air generated by the fan 3 flows together, a rotary distributor 5, in particular provided with a bladed impeller 51, and a diffusor 6 which receives the flow of air mixed with granular material to be distributed and supplies it to sowing elements which are illustrated by means of discharge conduits 7 which are connected to the diffusor by means of a tubular channel 71.

Figure 2:
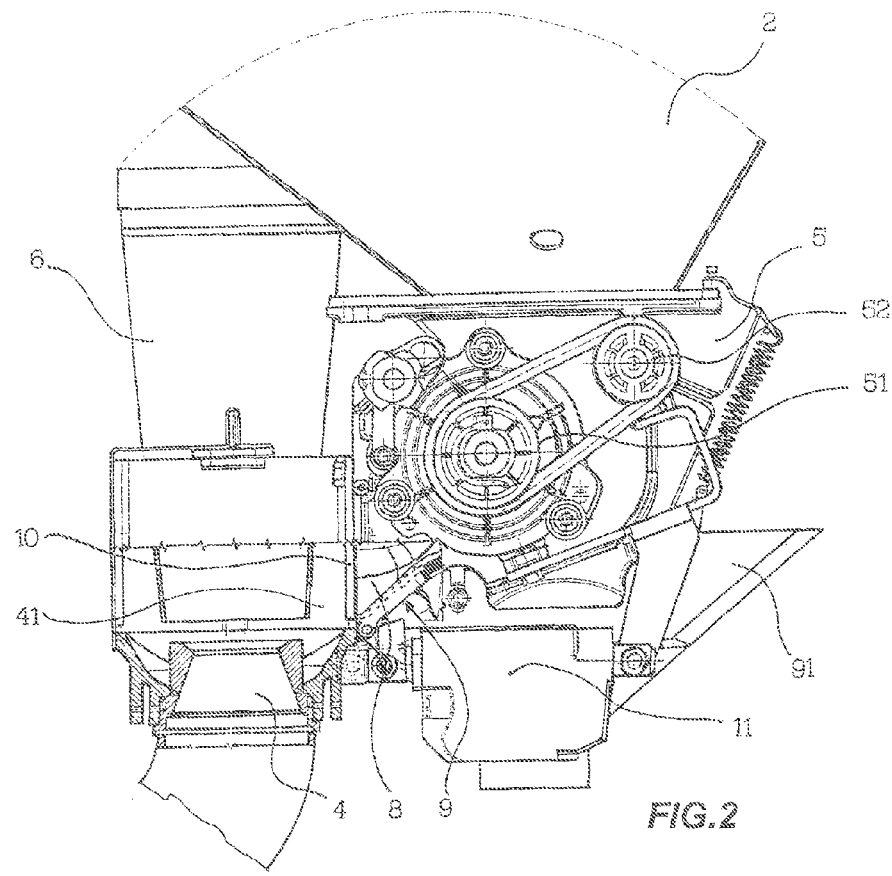
FIGS. 2 and 2A are a lateral cross-section of the component of the machine of FIG. 1 incorporating the device of this invention and a relevant detail.
Figure 2A:
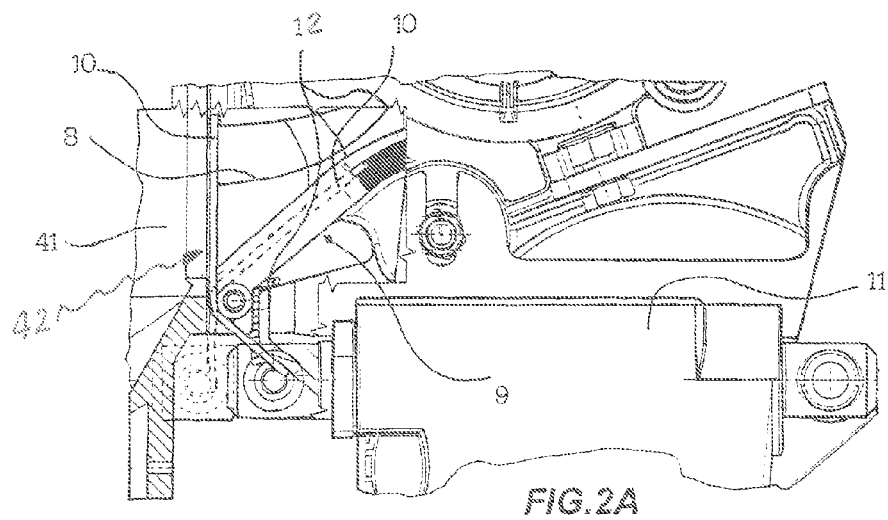

As illustrated more clearly in FIGS. 2 and 2A, the relationship between the above-mentioned components is such that the granular material contained in the receptacle 2 falls owing to gravitational force into the distributor 5 and is dispensed thereby in a through-conduit 8 which extends between the outlet of the distributor and a mixing chamber 41 of the Venturi 4 (and optionally including the Venturi itself), where it is mixed with an air flow and transported to the diffusor 6. In particular, there is defined in the mixing chamber a through-hole 42 which is constructed in the region of a partition wall 15 between the transport device 4 and the distributor 5 and which opens in the through-conduit 8 in such a manner as to place them in communication with each other.

There is further provided in the through-conduit 8 a calibration aperture 9 which is normally closed by a gate 10 in the form of a blade which is articulated at one end to the conduit 8 and which can be pivoted away from and towards the aperture 9 in order to open or close it. Springs 12 or other locking devices retain the gate 10 in a closed position which is also indicated as the distribution position, restoring the continuity of the through-conduit 8.

A linear actuator 11 of the electromechanical type is active between the fixed structure of the conduit 8 and the gate 10 in order to move it between the closed position mentioned and an open position which is also indicated as the calibration position, in which the granular material is dispensed through the aperture 9, thereby bringing about the calibration step previously illustrated. The operative distribution and calibration configurations, with the gate 10 in the respective position, are illustrated in FIGS. 2 and 2A, respectively, with a broken line (gate closed—distribution position) and solid line (gate open—calibration position).

As may be noted from those Figures, in the present embodiment when the gate 10 is in the open position, the flow of granular material is redirected by the gate 10 itself towards the aperture 9, further preventing the flow from reaching the chamber 41. Consequently, in the present embodiment, the gate 10 acts as a deflector of the flow. Alternatively, there may be provision for the aperture 9 to be arranged in a position below an outlet of the conduit 8, in such a manner that, when the gate 10 is open, the granular material is directed towards the aperture 9 simply owing to the effect of gravitational force. In that case, therefore, an action for redirecting the flow will not be necessary.

In the actuator 11, there are integrated a first and a second travel limit detector. Those travel limit detectors, which may also alternatively be constructed by means of external sensors, allow detection of whether the gate is in the open or closed position, consequently giving or not giving authorization for the calibration step of the distributor or for distribution over the whole field.

Those authorization signals are provided by means of suitable connection to a control unit which is not illustrated in the Figures and which, once the appropriate authorization has been received, allows or prevents the functions mentioned.

There is provision for the actuator 11 to be able to be of the electromechanical type, as in the present embodiment, or hydraulic, pneumatic, linear or rotary. There is further provision for it to be able to be unidirectional and for the opposite travel to actuation travel to be controlled by resilient return means, such as helical springs or the like. It must further be understood that, in the case of use of stepping motors, it may not be necessary to provide travel limit sensors, because such control is implicit in that type of actuation.

It is also known that the locking function brought about by the spring 15 may be brought about by the same actuator which may be controlled in such a manner as to keep the gate 10 locked in a closed position during normal operation of the seed-drill. Still as an alternative to the spring, or in combination with the spring, there may be provision, as a locking device, for a hook which is not illustrated in the Figures and which keeps the gate 10 locked in the closed position.

Finally, there is further provision for the distributor of the seed to be able to be rotated by an electric motor 52 in accordance with the authorization received by the control unit in order to drive the bladed rotor 51 of the distributor in rotation about its own axis for the number of rotations provided to carry out the calibration step.

Figure 3A:
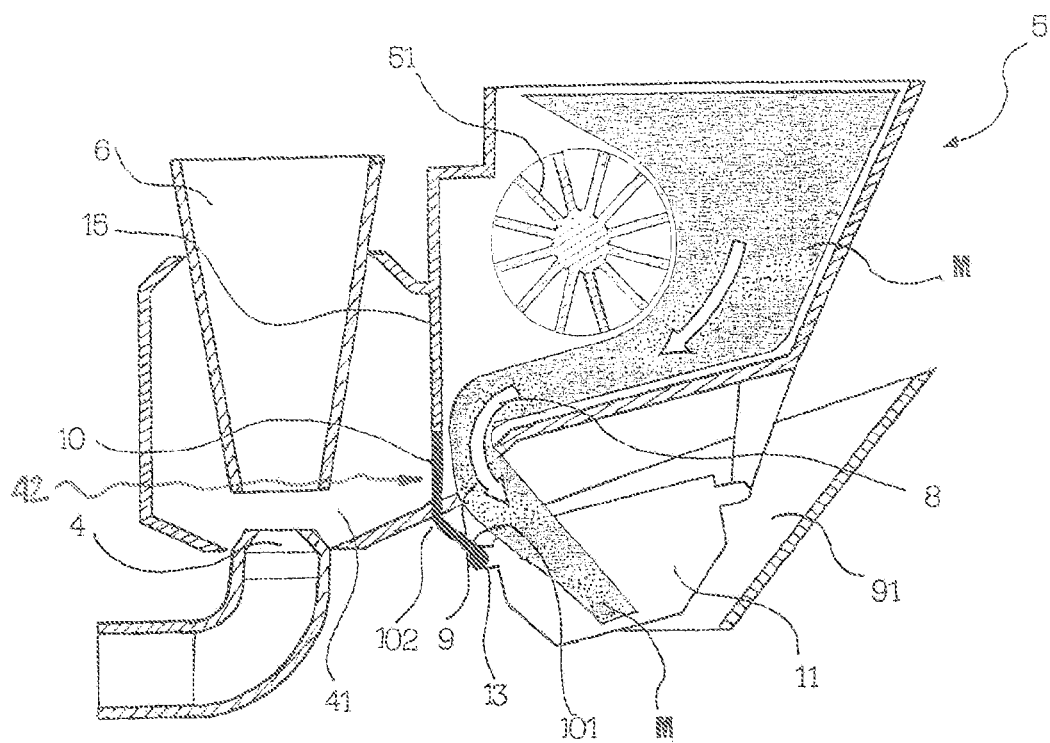
FIGS. 3A and 3B are two schematic side views, taken in section, which illustrate the operation of the device of the present invention in an operating calibration configuration and an operating distribution configuration, respectively.
Figure 3B:
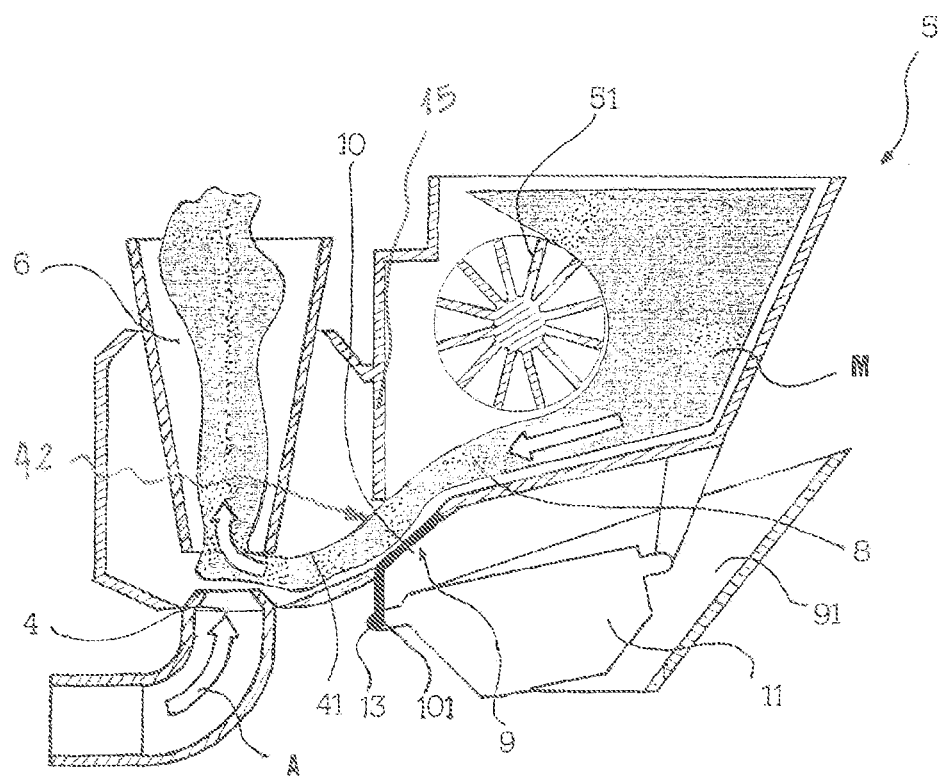

The operation of the device according to the present invention is therefore schematically illustrated in FIGS. 3A and 3B which illustrate the seed-drill in the calibration step and sowing step, respectively.

Figure 4A:
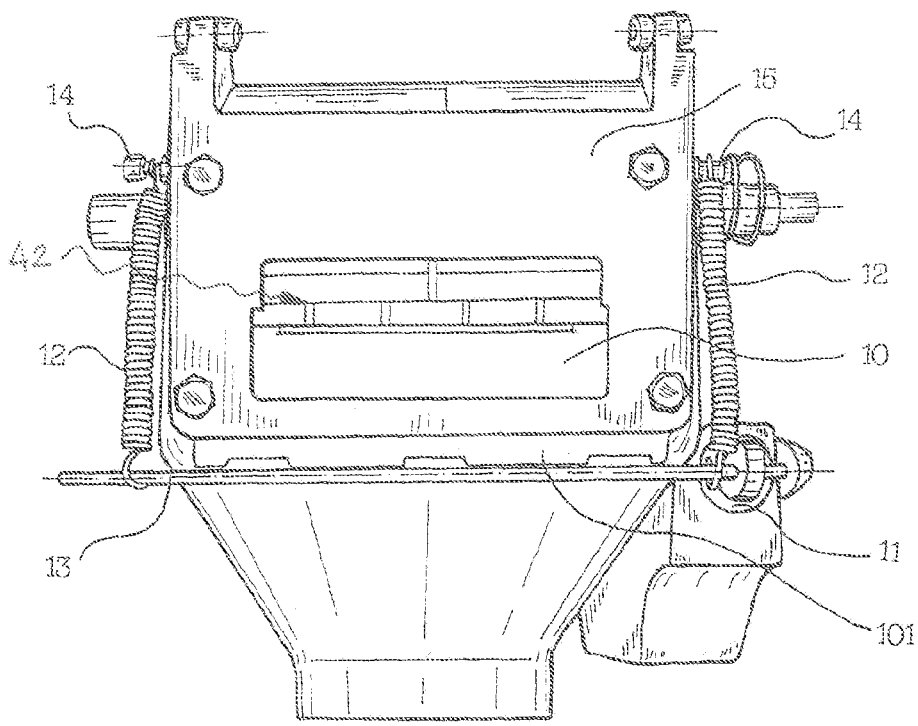
FIGS. 4A and 4B are two front views of a distributor and a relevant gate, details of the device according to the present invention, illustrated in the operating calibration configuration and in the operating distribution configuration, respectively.

During the calibration step, the granular material M is transported by means of the rotor 51 towards the through-conduit 8. In that step, the gate 10 is arranged in the open position, in such a manner as to release the passage towards the calibration aperture 9, directing the granular material M towards a receiving tank 91, which is provided with a discharge 92, illustrated in FIG. 1, from which the material used for the calibration may be recovered. At the same time, the gate 10 is arranged in such a position as to prevent the passage of the granular material M towards the chamber 41 and, more specifically, is arranged resting on the partition wall 15, on which there is constructed the through-hole 42 between the through-conduit 8 and the above-mentioned chamber 41, as can also be seen in FIG. 4A.

As mentioned above, the gate 10 is articulated in the region of an end 101 thereof to the actuator 11 by means of an articulation shaft 13. Furthermore, the gate 10 is additionally articulated by means of abutment between a vertex 102 thereof, or more generally an intermediate position thereof, and an edge of the calibration aperture 9. It is evident that, as an alternative to abutment, there could be used a different articulation system such as, for example, a pin. The gate 10 which is secured in this manner is therefore able to move by means of actuation involving a piston and crank rod, in which the linear movement of the actuator 11 which coincides with the movement of the piston produces a rotation of the gate 10 with respect to the point of rotation defined by the abutment between the vertex 102 and the edge of the aperture 9.

Figure 4B:
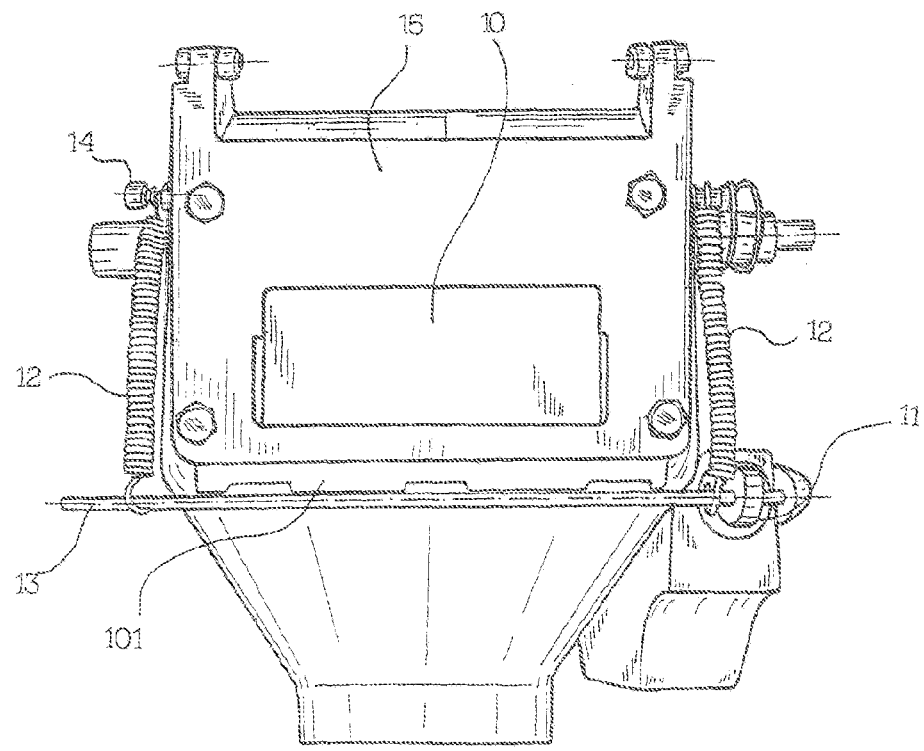

The movement of the actuator 11 may therefore move the gate 10 by means of a rotation movement in the closed position which is illustrated in FIGS. 3B and 4B. In that position, the through-hole 42 from the conduit 8 towards the chamber 41 is released and, at the same time, it blocks the calibration aperture 9. The granular material M may therefore continue towards the Venturi tube and become mixed with the air flow A therefrom, and thereby be directed to the diffusor 6.

It is known, as better illustrated in FIG. 4B, that the spring 12, which is connected at one end to a pin 14 which is fixed to the wall 15 and at the other end to the shaft 13 controlled by the actuator, is maintained in a rest position when the diffusor is in a closed position.

Conversely, by the actuator 11 being actuated, the spring 12 becomes tensioned in such a manner that, in the absence of other forces, the gate 10 tends to move again into a closed position.

The invention described in this manner allows a number of advantages over conventional devices. In particular, the functionality and efficiency of the calibration step are improved and a higher level of safety for the user is ensured.

The use of a rotary gate actuated with a piston/rod system further allows a substantial reduction in the risks of the moving members becoming jammed owing to the presence of dust and other similar material present in the working environment.

In addition, it is possible with the device according to the present invention to prevent the redirecting gate from blocking or obstructing the air flow from the transport device, this being positionable in the region of the partition wall between it and the distributor.

Since the gate in the distribution position is maintained in abutment with the partition wall 15, which delimits the mixing chamber 41, it is not affected by the air flow produced by the ventilator. Furthermore, the rotation of the gate takes place in a direction away from the mixing chamber even in the calibration position.

Finally, with the distributor and the transport device being kept separate, it is possible to prevent, during the calibration step, a portion of the material from being able to be directed to the diffusor, thereby causing errors in the calibration step.

The invention claimed is:

1. An agricultural seed-drill having automatic distribution comprising:
    a pneumatic transport device comprising a mixing chamber for mixing granular materials (M) with an air flow generated by a fan and directed in an ascending direction towards a diffusor, which receives the air flow mixed with the granular materials (M) in the mixing chamber in order to dispense the granular materials to sowing elements,
    a distributor for granular materials (M) comprising a through-conduit for the granular materials (M), and
    a device for calibrating the granular materials dispensed by the distributor comprising:
        a calibration aperture which is formed in the through-conduit, between the distributor of the seed and the transport device for transporting the material (M),
        a through-hole between the through-conduit and the mixing chamber and
        a gate which is selectively associate with the calibration aperture or the through-hole,
wherein the through-hole is constructed in the region of a partition wall between the mixing chamber and the distributor, and delimiting the mixing chamber, and further comprising a motorized actuator which is capable of rotating the gate between a calibration position in which the gate is resting on the wall so as to close the through-hole and a distribution position in which the calibration aperture is closed and the material travels through the through-hole towards the mixing chamber of the transport device in order to be mixed with the ascending air flow.

2. The agricultural seed-drill according to claim 1, wherein the rotation of the gate takes place in a direction away from the mixing chamber.

3. The agricultural seed-drill according to claim 1, wherein the gate is articulated in the region of an edge of the calibration aperture.

4. The agricultural seed-drill according to claim 1, wherein the actuator is of the linear type and is articulated to the gate in the region of an end thereof in such a manner that the gate is movable in rotation between the calibration position and the distribution position.

5. The agricultural seed-drill according to claim 1, wherein there is provided at least one first travel limit detector active on the gate for determining whether the gate is closed in the distribution position.

6. The agricultural seed-drill according to claim 5, wherein there is provided at least one second travel limit detector active on the gate for determining whether the gate is open in the calibration position.

7. The agricultural seed-drill according to claim 6, wherein the travel limit detectors are associated with a control unit to allow calibration and/or distribution by the device.

8. The agricultural seed-drill according to claim 1, wherein the gate, when in the calibration position, impedes the passage of the granular material (M) from the through-conduit to the transport device.

9. The agricultural seed-drill according to claim 1, wherein the gate, when in the calibration position, diverts the flow of granular material (M) towards the aperture.

10. The agricultural seed-drill according to claim 7, wherein there is provided a motor governed by the control unit and capable of rotating the distributor at the operational command of the control unit subject to authorization of the travel limit detectors.

11. The agricultural seed-drill according to claim 1, wherein the actuator is a linear actuator.

12. The agricultural seed-drill according to claim 11, wherein the linear actuator is of an electromechanical type.

13. The agricultural seed-drill according to claim 1, comprising resilient means for returning the gate, said means being adapted for holding the gate in a closed position.

* * * * *